(12) United States Patent
Sheu et al.

(10) Patent No.: US 8,539,039 B2
(45) Date of Patent: Sep. 17, 2013

(54) REMOTE SERVER ENVIRONMENT

(75) Inventors: Philip Sheu, San Jose, CA (US); Yu Qing Cheng, San Jose, CA (US); Ching-Hsu Hsiao, Taipei (TW); Kay Chen, San Jose, CA (US); Mark Lee, Saratoga, CA (US); Robert Ha, Saratoga, CA (US); Thomas Deng, Cupertino, CA (US)

(73) Assignee: Splashtop Inc., San Jose, CA (US)

( * ) Notice: Subject to any disclaimer, the term of this patent is extended or adjusted under 35 U.S.C. 154(b) by 266 days.

(21) Appl. No.: 13/165,469

(22) Filed: Jun. 21, 2011

(65) Prior Publication Data

US 2011/0314093 A1 Dec. 22, 2011

Related U.S. Application Data

(60) Provisional application No. 61/357,274, filed on Jun. 22, 2010.

(51) Int. Cl.
*G06F 15/16* (2006.01)

(52) U.S. Cl.
USPC ........... 709/217; 709/202; 709/203; 709/209; 709/227

(58) Field of Classification Search
USPC .......................... 709/202, 203, 209, 217, 227
See application file for complete search history.

(56) References Cited

U.S. PATENT DOCUMENTS

| | | | | |
|---|---|---|---|---|
| 5,666,530 A * | 9/1997 | Clark et al. | ............................ | 1/1 |
| 7,006,881 B1 * | 2/2006 | Hoffberg et al. | ................ | 700/83 |
| 7,133,362 B2 * | 11/2006 | Chu et al. | ....................... | 370/230 |
| 7,428,339 B2 * | 9/2008 | Wang et al. | .................... | 382/236 |
| 7,518,614 B2 * | 4/2009 | Emerson et al. | ............... | 345/502 |
| 7,590,744 B2 * | 9/2009 | Richardson et al. | .......... | 709/227 |
| 7,870,153 B2 * | 1/2011 | Croft et al. | ..................... | 707/781 |
| 7,912,966 B2 * | 3/2011 | Witkowski et al. | ........... | 709/227 |
| 8,028,075 B2 * | 9/2011 | Richardson et al. | .......... | 709/227 |
| 8,271,675 B2 * | 9/2012 | Oh et al. | ......................... | 709/231 |
| 2004/0103151 A1 | 5/2004 | Ettinger et al. | | |
| 2007/0097130 A1 | 5/2007 | Margulis | | |
| 2007/0198001 A1 | 8/2007 | Bauch et al. | | |
| 2008/0244705 A1 * | 10/2008 | Cromer et al. | ..................... | 726/3 |
| 2009/0162037 A1 | 6/2009 | Du Val | | |
| 2010/0106766 A1 | 4/2010 | Bailey et al. | | |
| 2010/0106769 A1 * | 4/2010 | Blanchard et al. | ............. | 709/203 |
| 2010/0169414 A1 * | 7/2010 | Pavot et al. | .................... | 709/203 |
| 2010/0318598 A1 * | 12/2010 | Yun et al. | ....................... | 709/203 |
| 2011/0276619 A1 * | 11/2011 | Khan et al. | ..................... | 709/203 |
| 2011/0314093 A1 * | 12/2011 | Sheu et al. | ..................... | 709/203 |
| 2012/0089921 A1 * | 4/2012 | Bellini | .......................... | 715/740 |
| 2012/0130808 A1 * | 5/2012 | Paz et al. | ..................... | 705/14.52 |

* cited by examiner

*Primary Examiner* — Michael Won
(74) *Attorney, Agent, or Firm* — Perkins Coie LLP; Michael A. Glenn

(57) ABSTRACT

A system in which computer content is encoded at low latency and distributed to one or more client devices and in which user gestures on the client device are translated into a digital representation of the computer's native input format, thereby allowing the client device to control the computer. A method of capturing screen data on a desktop system, packaging the captured content, streaming the content to one or more client device, decoding the content on the client-side, displaying the decoded content on the client device, accepting user input, transmitting the user input to the desktop system, translating the input into a native format, and controlling the desktop system using the translated user input.

30 Claims, 13 Drawing Sheets

REMOTE SERVER ENVIRONMENT

CROSS REFERENCE TO RELATED APPLICATIONS

This application claims priority to Provisional Patent Application Ser. No. 61/357,274, filed Jun. 22, 2010, entitled "Remote Server Environment" which is incorporated herein in its entirety.

BACKGROUND OF THE INVENTION

1. Technical Field

The invention relates to remote control of a computer system.

More specifically, the invention relates to frame-by-frame encoding of a desktop computer display, transmitting the encoded view to a thin client device, decoding the stream on the thin client device, and translating inputs made on the thin client device for controlling the remote desktop.

2. Description of the Prior Art

In computing, there are techniques for sharing a view of a desktop computer. Virtual Network Computing ("VNC") is a graphical desktop sharing system that uses a remote frame buffer ("RFB") protocol over wired or wireless network connections to share a view of the desktop to other devices. The client devices decode the video data and display the view of the desktop.

VNC systems can sometimes be adequate for resource light applications such as remote troubleshooting and collaborative word-processing; however, known VNC solutions suffer a number of major drawbacks.

First, many modern applications demand low latency times between user input and the corresponding output, as well as with video rendering, in general. For example, participants in a videoconferencing session are often frustrated by delays between speech and output between the participants of a conversation. This can lead to miscommunication. Also, in the world of online gaming, latency leads to unacceptable delays between input and action that disadvantage players having high latency.

Next, traditional VNC system approaches assumed that the desktop computer and the client system shared a common system for providing input. For example, in a common remote computing scenario, a traveling business person logs into his work computer from a remote location, i.e. a hotel. Traditional VNC systems assumed that the work computer and the hotel computer were each equipped with a keyboard and a mouse or other pointing device. This paradigm has worked in the past, but an expansion of alternative inputting methods render traditional VNC systems obsolete.

SUMMARY OF THE INVENTION

The invention provides a system in which computer content is encoded and distributed to one or more client devices and in which user gestures on the client device are translated into a digital representation of the computer's native input format, thereby allowing the client device to control the computer.

Some embodiments of the invention involve a distributed computer system comprising a desktop server networked with one or more client devices, wherein the desktop system is configured to encode content, and wherein the one or more client devices are configured to decode content. The one or more client devices are also configured for transmitting users inputs back to the desktop server, and the desktop device is configured for translating the inputs and controlling an application running on the desktop server.

Some embodiments of the invention involve a method of capturing screen data on a desktop system, packaging the captured content, streaming the content to one or more client device, decoding the content on the client-side, displaying the decoded content on the client device, accepting user input, transmitting the user input to the desktop system, translating the input into a native format, and controlling the desktop system using the translated user input.

Some embodiments of the invention involve unique solutions for encoding desktop content efficiently to reduce latency.

Some embodiments of invention involve specific gesture translation techniques for translating gestures native to a client device into inputs recognized by the desktop server. Some embodiments of the invention involve rendering virtual controllers on a client device.

Some embodiments of the invention involve peer-to-peer infrastructure for sharing a desktop environment. Some embodiments of the invention involve transmission of a plurality of desktop environments to create a social gaming network of friends.

Some embodiments of the invention involve a multi-modal system of viewing and controlling a desktop server on a remote device.

DETAILED DESCRIPTION OF THE INVENTION

The invention provides a system in which computer content is encoded at low latency and distributed to one or more client devices and in which user gestures on the client device are translated into a digital representation of the computer's native input format, thereby allowing the client device to control the computer.

The invention is particularly useful in the case where the client device comprises a thin client without processing capabilities that are sufficient or optimal for running rich media applications. For example, an attractive feature of tablet computers is their slight profile and lightweight construction; however, this form factor inherently limits the space for processing hardware, memory, and cooling systems. Accordingly, tablet computers do not have the same potential for high performance as a larger computer simply because the large computer can physically accommodate this hardware.

Therefore, the preferred embodiments of the invention involve configuring a desktop computer to run processing-heavy application and streaming the video output to one or more thin client devices including, but not limited to tablet computers, smartphones, personal digital assistants, laptops, portable video players, portable gaming systems, and on-board vehicle computers. Although the term "desktop" is used throughout the disclosure, the term shall include any processing machine that has the computing resources to carry out the invention.

System Overview

Figure 1:
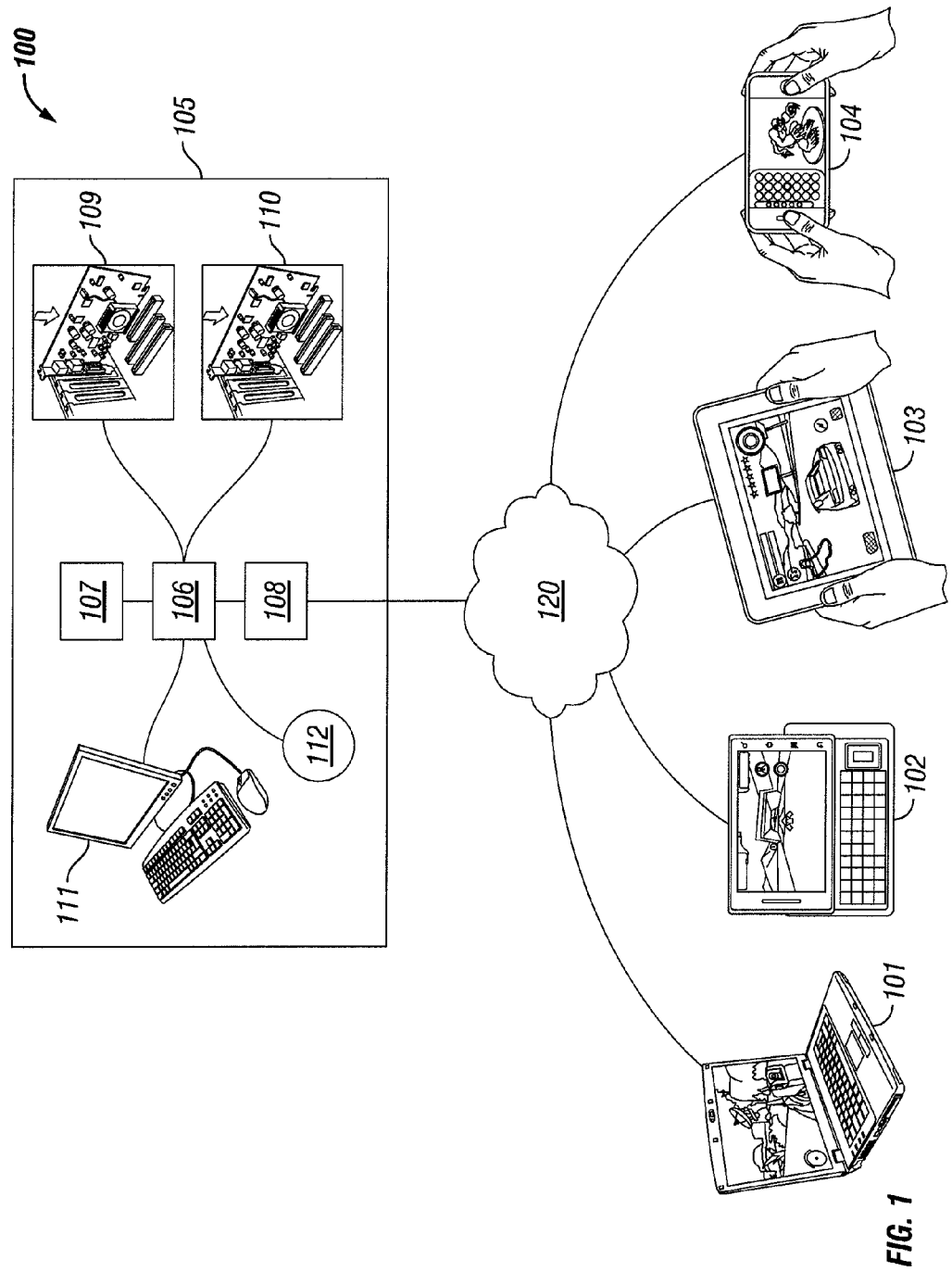
FIG. 1 illustrates a computer environment for streaming encoded content from a desktop to one or more client devices, decoding on the client-side, and for delivering control information back to the desktop system for processing according to some embodiments of the invention.

FIG. 1 illustrates a computer environment 100 for streaming content from a desktop system 105 to one or more client devices 101, 102, 103, 104, for decoding the content on the client-side, and for delivering control information back to the desktop system 105 from the one or more client devices 101, 102, 103, 104.

In the presently preferred embodiments, the desktop system 105 comprises at least one processor 106 operatively coupled with memory 107, a network interface 108, and one or more input/output devices 111.

The desktop system 105 is operatively coupled with a network 120 via the network interface 108. The network 120 can comprise one or more of any type of computer network including a local area network (LAN), personal area network (PAN), wide area network (WAN), metropolitan area network (MAN), wireless local area network (WLAN), wireless wide area network (WWAN), peer-to-peer network, or other computer network, now know or later developed.

In some embodiments of the invention, the processor 106 comprises an on-board graphics processing unit (not shown). In some other embodiments of the invention, the processor 106 is operatively coupled to video processing expansion card 109. In some embodiments of the invention, the processor is operatively coupled with a proprietary expansion card 110 especially configured for performing the encoding operations disclosed herein.

In the presently preferred embodiments of the invention, the desktop system 105 streams encoded content on a per frame basis from the desktop 105 to the one or more client devices 101, 102, 103, 104. The one or more client devices 101, 102, 103, and 104 include one or more local applications, embodied in either hardware or software, which decodes the streamed content and displays the decoded content. The one or more client devices 101, 102, 103, and 104 also include an input device and a transmission module for accepting user inputs and delivering user input back to the desktop system 105.

The desktop system 105 further comprises an input translation module 112 coupled with the processor 106. The input translation module 112 is configured for translating input formats native to the one or more client devices 101, 102, 103, 104 into a corresponding input known to the desktop system 105.

In the presently preferred embodiments of the invention, the one or more client devices 101, 102, 103, and 104 include one or more local applications, embodied in either hardware or software, that translate controls native to the device into controls that are compatible with the desktop system 105.

According to some other embodiments of the invention, the desktop system 105 receives user inputs from the one or more client devices 101, 102, 103, 104 in first format via said network interface 108. If the desktop system 105 does not recognize the first format, the processor 106 passes those user inputs to the translation module 112 and the translation module 112 translates the first format into a second format that is recognizable by the desktop system 105.

In the presently preferred embodiments of the invention, the desktop system 105 contains all the hardware and software to capture screen data, scale, perform color conversion, encode, multiplex, and transmit encoded video data. According to these embodiments, there is not a need for an online video encoding engine or intermediary server hub—eliminating time of flight delays that unacceptably contribute to latency.

In some embodiments of the invention, the processor 106 includes one or more processing modules for performing some of the computing functions. Likewise, in some embodiments of the invention, the one or more client devices 101, 102, 103, 104 include one or more processing modules for performing some of the computing functions.

As used herein, the term "module" refers to any software or hardware processing component or portion therefor that may be used to implement one or more of the processing functions.

In some embodiments of the invention, a client device is preloaded with hardware or software for receiving image file data, decoding the data, or translating device gestures into desktop control instructions. In some other embodiments, an application for receiving image file data, decoding the data, or translating device gestures is available to client device operators to download and install on their device. In yet other embodiments, a software application for configuring a client device is available through a third-party service, such as an app-store.

In some embodiments of the invention, a user performs an initial configuration of the system to optimize the streaming of desktop content to his client device. According to these embodiments, one or more databases of settings are made available to the user for storing settings, screen parameters, screen resolutions, etc. According to these embodiments, the computer system 105 is able to encode and transmit screen data in the appropriate formats in a more streamlined workflow. In some other embodiments, the computer system 105 or the one or more client device 101, 102, 103, 104 discover settings, parameters, resolutions, etc. automatically.

Workflow

Figure 2A:
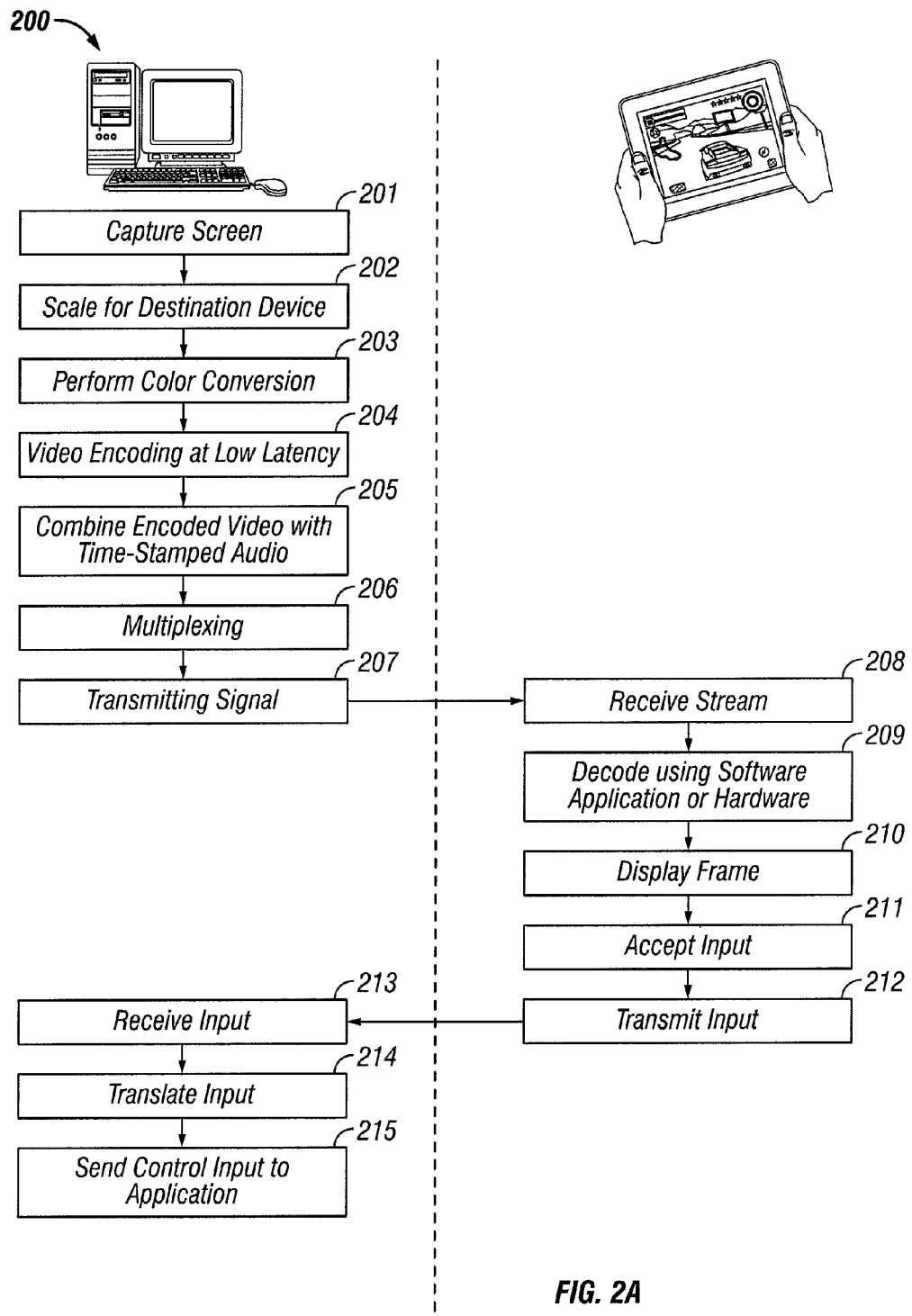
FIG. 2A illustrates an exemplary workflow including the processing steps taken at the desktop-side and at the client-side in a streaming desktop environment according to some embodiments of the invention.

FIG. 2A illustrates an exemplary workflow 200 including the processing steps taken at the remote desktop-side and at the client-side in a streaming desktop environment.

The workflow 200 begins with capturing screen data 201 from the desktop computer at a particular frame rate. In some embodiments of the invention, the screen data is captured as a raster graphic image. In some other embodiments, the screen data is captured as a vector graphics image. In some embodiments of the invention, frames are processed serially, while in other embodiments perform parallel processing, redundant processing, single instruction, multiple data (SIMD) processing, multiple instruction, multiple data (MIMD) processing, or any other processing method now known or later developed.

Initially, the computer display resolution is modified to best fit the client resolution or display exactly as is on the computer display onto the client display. This provides the best performance and display quality onto the client display. After the frame is captured, the captured image file may be scaled to fit the dimensions of the destination device 202. The additional scaling may be done to reduce the file size and therefore bandwidth used on the network. In the presently preferred embodiments of the invention, the dimensions of the destination device are predetermined through automatic discovery or by user specification via a GUI.

Next, color conversion is performed 203 on the scaled image data image data to comply with the native color values of the destination device. In the presently preferred embodiments of the invention, the native color values of the destination device are predetermined through automatic discovery or by user specification via a GUI.

The image file data is then encoded for video playback. In the presently preferred embodiments of the invention, the image file data is encoded at very low latency. In a specific example, a H.264/MPEG-4 codec at low latency is used to encode image data.

The encoded image file data is then matched with time-stamped audio 205 and multiplexed 206. Next, the multiplexed signal is transmitted 207 to one or more client devices via a network comprising one or more of a local area network (LAN), personal area network (PAN), wide area network (WAN), metropolitan area network (MAN), wireless local area network (WLAN), wireless wide area network (WWAN), peer-to-peer network, or other computer network, now know or later developed.

As explained above, the one or more client devices are configured with hardware or software that is configured to receive and decode encoded video from the desktop.

Accordingly, the workflow 200 continues with the client device receiving an encoded video stream 208 and decoding the stream 209. The encoded video has already been scaled and converted into device-native colors and resolutions, so the device simply displays the decoded video frames at the frame rate that they are received.

The workflow 200 also involves accepting input from the user of a client device 211 and transmitting the input information back to the desktop 212.

User input takes a wide variety of forms. Most simply, user input comprises a pointer tracking input, pointer clicking input(s), and keyboard input. A pointer tracking input most commonly takes the form of a computer mouse device, but can take other forms such as trackballs, joysticks, pressure sensitive pointing stick, graphics tablet, touchpad and stylus, and touch screen operated with human fingers.

Many of inputs from these types of pointing tracker devices are relatively straightforward to port from the client device to the desktop since they all involve two-dimensional coordinate values. However, a number of client devices utilize input types not intuitively translatable to the mouse/keyboard paradigm. For example, there is not a simple way to distinguish a screen tap on a touch screen device as a right click of a mouse or a left click of a mouse. Likewise, there is not an intuitive way to "mouse-over" an item using a touchscreen device. Similarly, many mobile devices include a built in gyroscope that uses the tilt of the device as a control.

Accordingly, the invention involves translating native client device control inputs into control inputs recognizable by the desktop.

In the presently preferred embodiments of the invention, the client device includes one or more local applications, embodied in either hardware or software, that translate controls native to the device into controls that are compatible with the desktop system.

In some embodiments of the invention, the client device simply transmits its native input signals and the desktop performs the translations. In some other embodiments of the invention, the client device includes hardware or software for translating inputs.

The workflow 200 of FIG. 2A continues as the desktop receives the control input 213 transmitted by the client device and the desktop translates the client device control input into a desktop native control signal 214. Translating control signals is discussed in greater detail below. Finally, the workflow 200 involves delivering the control instructions 215 to one or more application running on the desktop.

A key to the invention is that the steps of capturing screen data, encoding the frames, packaging the frames with audio, and transmitting the frames as fast as possible. Therefore, the invention includes various techniques to speed this process up including using graphics accelerators, using dedicated expansion encoder cards, and multi-threading.

Figure 2B:
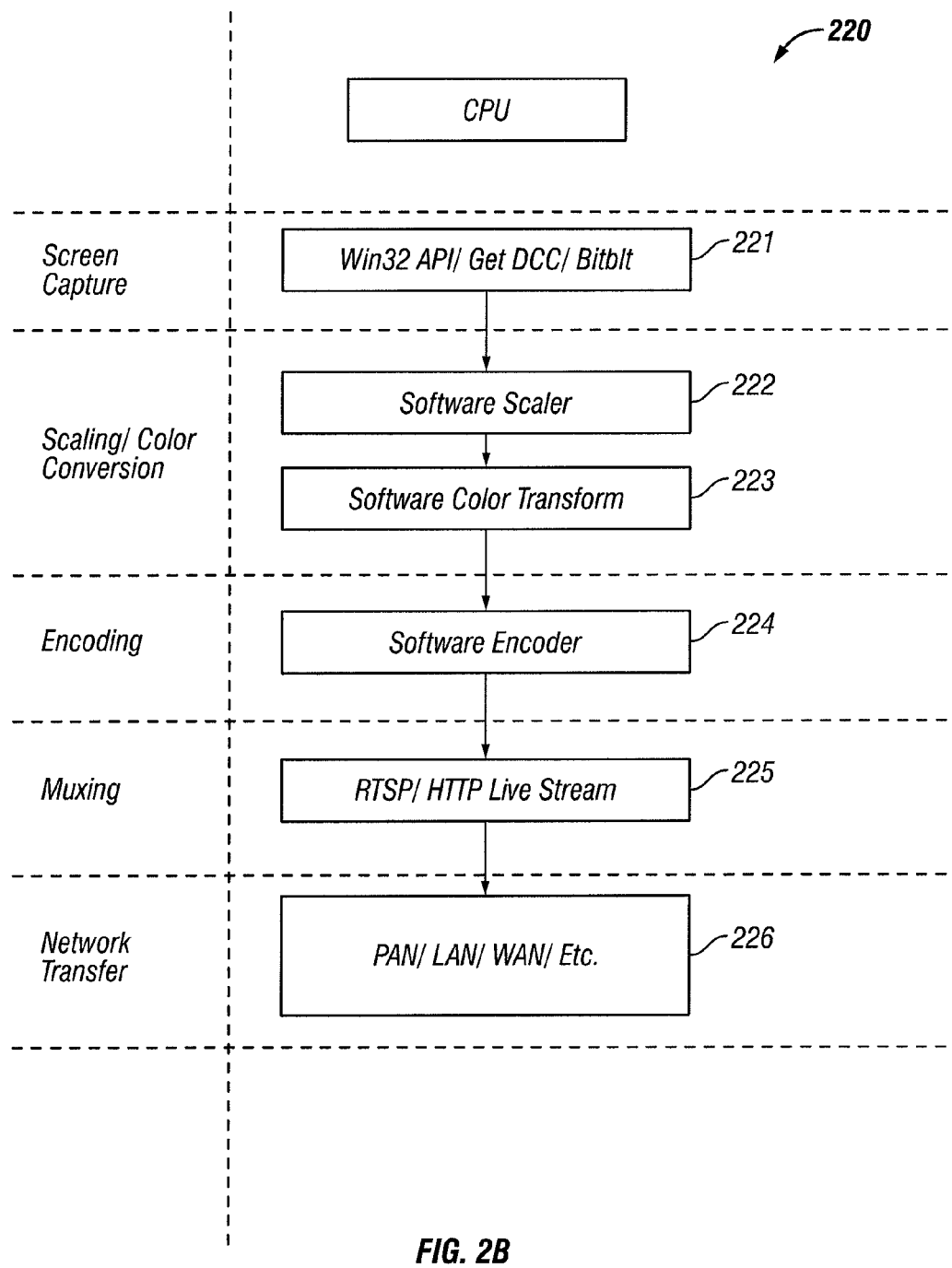
FIG. 2B illustrates a workflow including the processing steps of a desktop server for streaming the desktop environment to a client device using only an onboard CPU according to some specific embodiments of the invention.
Figure 2C:
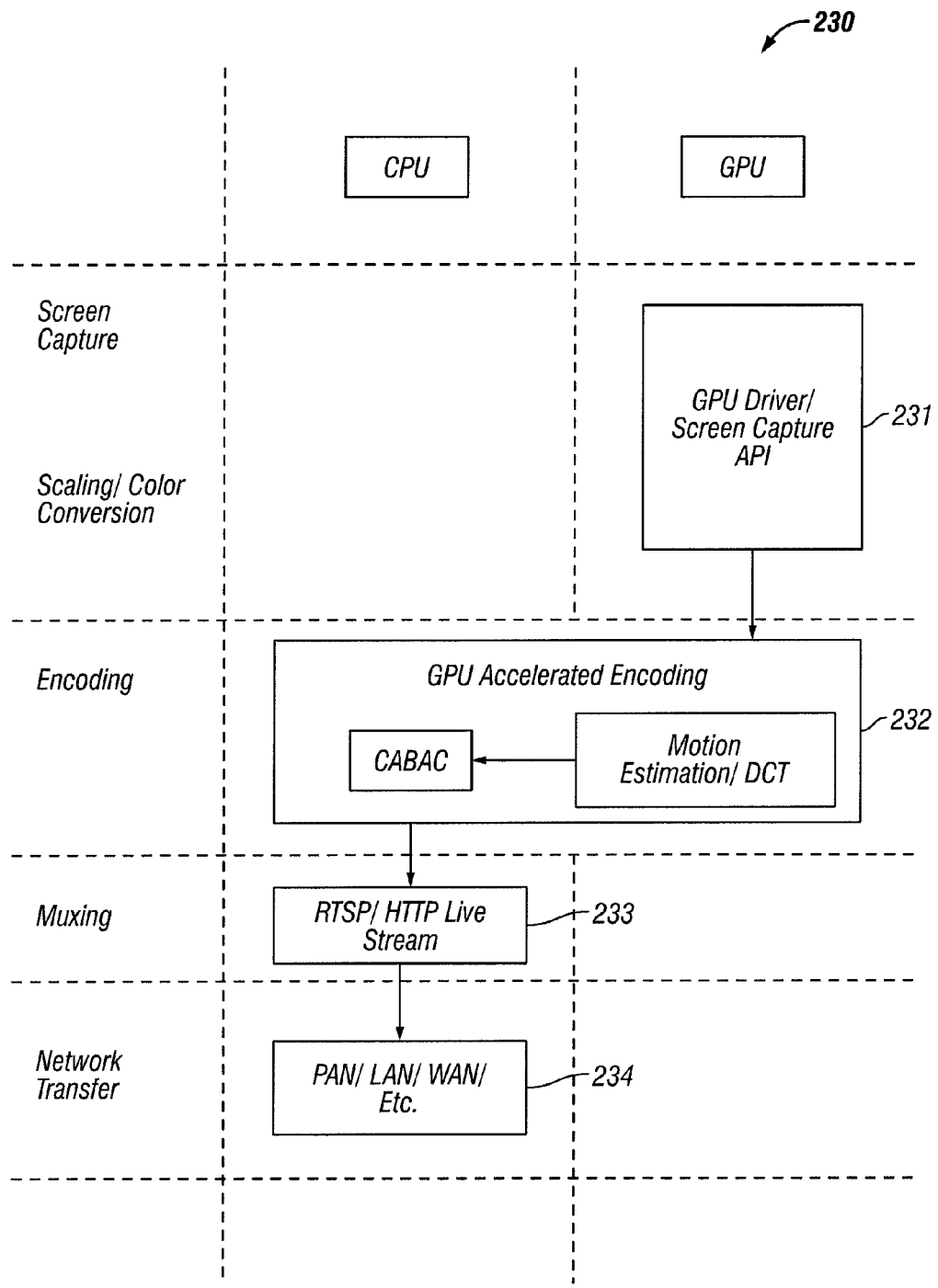
FIG. 2C illustrates a workflow including the processing steps of a desktop server for streaming the desktop environment to a client device using an onboard CPU and a graphics accelerator according to some specific embodiments of the invention.
Figure 2D:
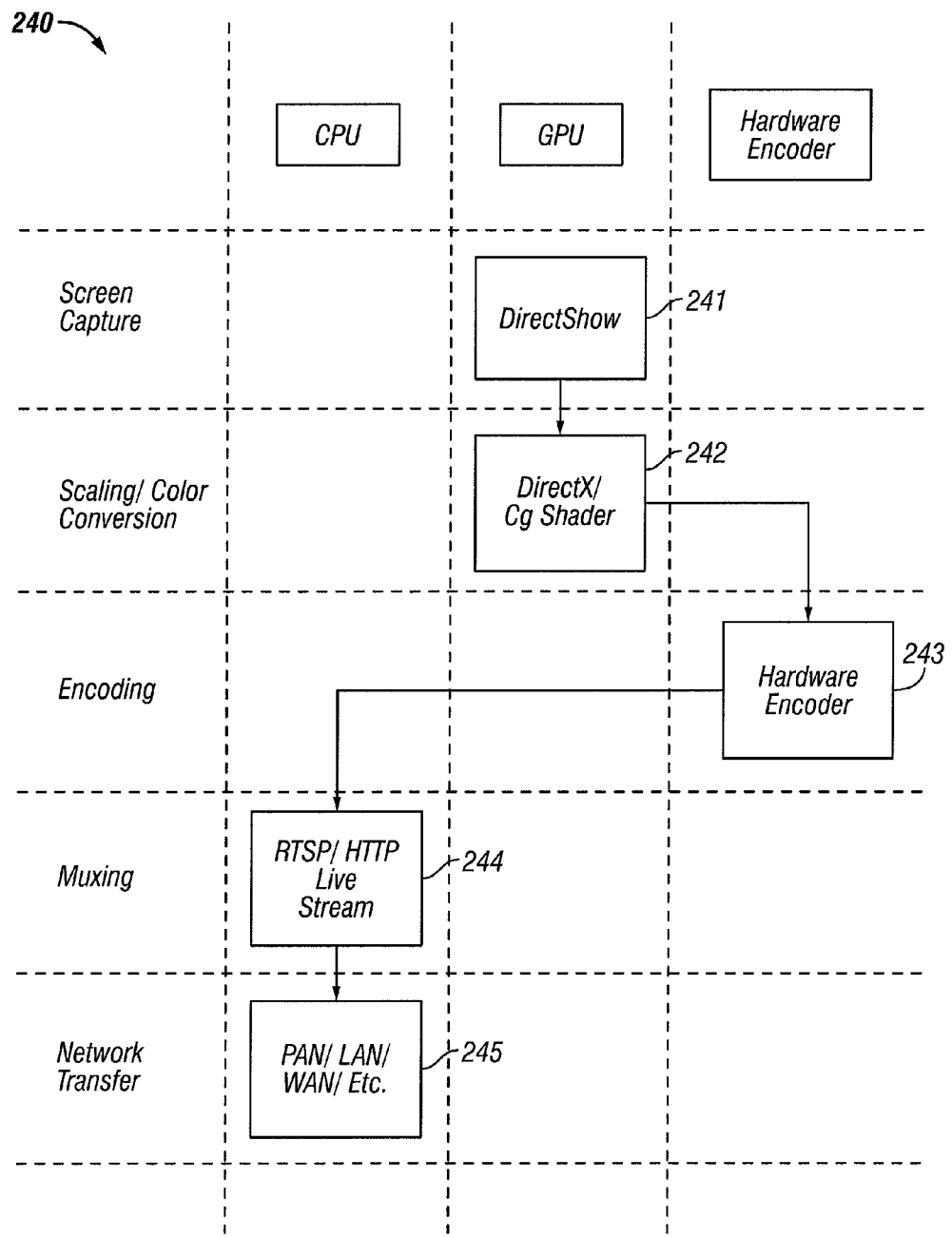
FIG. 2D illustrates a workflow including the processing steps of a desktop server for streaming the desktop environment to a client device using an onboard CPU, a GPU, and a standalone hardware encoder according to some specific embodiments of the invention.

As explained above, the desktop device optionally includes one or more graphics accelerator or peripheral expansion card designed to perform the processing steps of the invention at a greater speed. FIGS. 2B-2D illustrate various exemplary workflow solutions according to some embodiments of the invention.

FIG. 2B illustrates a workflow 220 including the processing steps of a desktop server for streaming the desktop environment to a client device using only an onboard CPU according to some specific embodiments of the invention.

The workflow 220 of FIG. 2B begins with capturing screen data on a desktop server machine 221. According to FIG. 2B, the screen capture is performed using a Windows® API and one or more of a device context retrieval function ("GetDC") function and a Bit-block transfer function ("BitBlt").

Next, the captured screen data is scaled 222 and converted to the appropriate color-space 223 and encoded 224. The example of FIG. 2B simply employs software for performing the steps of scaling 222, color conversion 223 and encoding 224.

The encoded image file data is then matched with a time-stamped audio signal and any control input information and multiplexed 225. According to this example, the workflow 220 utilizes one or more of a Real Time Streaming Protocol (RTSP) and a HTTP Live Streaming Protocol.

Finally, the multiplexed signal is transmitted 226 to one or more client devices via a PAN, LAN, WAN, etc.

Some other embodiments of the invention involve using both an on-board CPU processor and a graphics accelerator expansion card for performing the various processing steps. FIG. 2C illustrates a workflow 230 including the processing steps of a desktop server for streaming the desktop environment to a client device using an onboard CPU and a graphics accelerator according to some specific embodiments of the invention.

The workflow 230 of FIG. 2C begins with capturing screen data on a desktop server machine, scaling the data, and converting to the appropriate color-space 231 all using a graphics processing unit and a screen capture API.

Next, the captured screen data is encoded 232 using the CPU and the GPU. The example of FIG. 2C involves GPU accelerated processing using an OpenCL API and a General-Purpose computing on graphics processing units (GPGPU) technique, such as CUDA developed by Nvidia®. These techniques involve using motion estimation, discreet cosine transforms (DCT) and lossless compression techniques, such as Context-adaptive binary arithmetic coding (CABAC).

The encoded image file data is then matched with a time-stamped audio signal and any control input information and multiplexed 233. According to this example, the workflow 220 utilizes one or more of a Real Time Streaming Protocol (RTSP) and a HTTP Live Streaming Protocol.

Finally, the multiplexed signal is transmitted 234 to one or more client devices via a PAN, LAN, WAN, etc.

As explained above, the desktop device optionally includes one or more graphics accelerator and a standalone hardware encoder.

FIG. 2D illustrates a workflow 240 including the processing steps of a desktop server for streaming the desktop environment to a client device using an onboard CPU, a GPU, and a standalone hardware encoder according to some specific embodiments of the invention.

The workflow 240 of FIG. 2D begins with capturing screen data on a desktop server machine 241 using a GPU and API. According to this example, the workflow 240 utilizes Microsoft® DirectShow for screen capture.

After the screen is captured, the captured image file is scaled to fit the dimensions of the destination device and color conversion is performed 242 on the scaled image data image data to comply with the native color values of the destination device. According to this example, the workflow 240 utilizes a Microsoft®, DirectX API and a Nvidia® Cg shader.

Next, encoding is performed using a standalone hardware encoder dedicated to low latency video encoding 243.

The encoded image file data is then matched with a time-stamped audio signal and any control input information and multiplexed 244. According to this example, the workflow 240 utilizes one or more of a Real Time Streaming Protocol (RTSP) and a HTTP Live Streaming Protocol.

Finally, the multiplexed signal is transmitted 245 to one or more client devices via a PAN, LAN, WAN, etc.

Although GPU-assisted encoding and dedicated hardware solutions are an effective way to speed up the encoding and transmission of screen data, multi-processing is also an effective way to encode screen frame data at low latency.

Figure 2E:
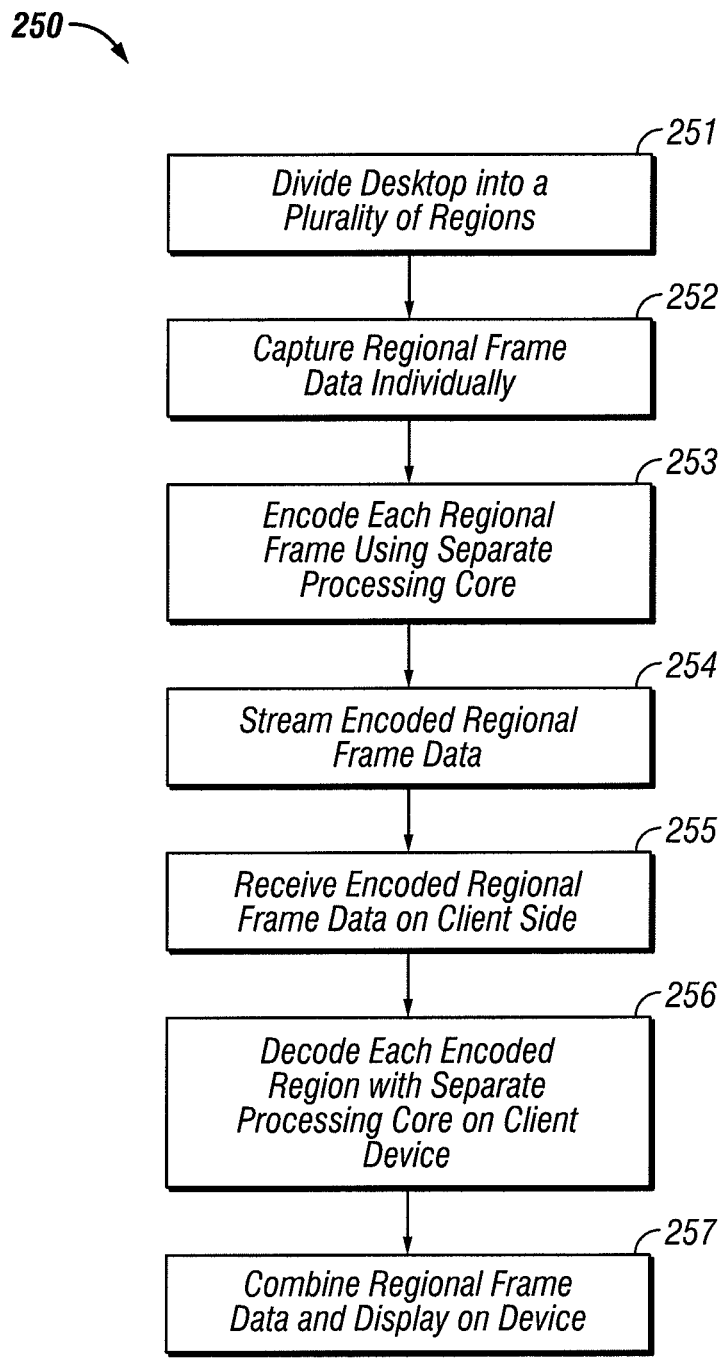
FIG. 2E illustrates a method of multi-processing screen image data to increase encoding speed according to some embodiments of the invention.

FIG. 2E illustrates a method 250 of multi-processing screen image data to increase encoding speed according to some embodiments of the invention. The method 250 begins with virtually dividing the desktop server into a plurality of regions 251. The screen regions are then individually captured 252. In the presently preferred embodiments of the invention, the screen regions are individually captured using a GPU Screen Capture API, as described above.

Next, each individual regional frame is encoded using a separate processing core 253 of the CPU or dedicated encoder peripheral. The encoded regional frame data is then streamed to the client device 254 via one or more network or peer-to-peer infrastructure.

The client device receives encoded regional frame data 255 and decodes each encoded region 256. In some embodiments of the invention, the client device comprises a multi-core processor and each core processes a single regional frame.

Finally, the regional frame data is combined and displayed 257 on the client device.

Although specific workflows using specific hardware and software modules are disclosed herein, those with ordinary skill in the art having the benefit of this disclosure will appreciate that a wide variety of hardware and software modules, now known or later developed, in many configurations are equally applicable for carrying out the invention.

Gesture Translation and Native Input Device Rendering

As explained above, some embodiments of the invention involve translating control inputs received from a user of a client device into control instructions understandable by a remote desktop server. Table 1 is an exemplary translation table equating touch screen controls with controls common to a two-button mouse.

TABLE 1

| Touch Screen Control Input | Two Button Mouse Input |
|---|---|
| One Finger Tap | Left Click |
| Two Finger Drag | Window Scroll |
| One Finger Tap and Hold | Right Click |
| Two Finger Tap | Mouse Over |
| Three Finger Drag | Scroll Screen |
| Three Finger Tap | Toggle Keyboard/ Toggle Game Controls |

Figure 3:
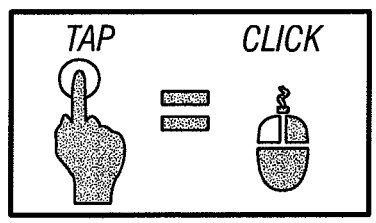
FIG. 3 illustrates a graphical representation of a touch screen gesture translation table according to some embodiments of the invention.
Figure 3:
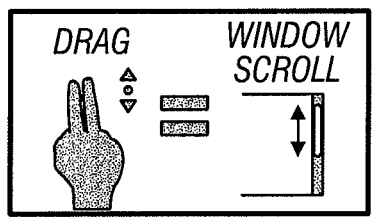
Figure 3:
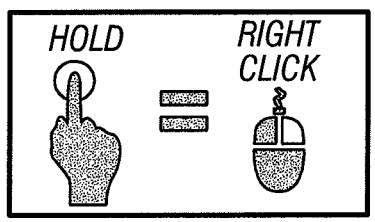
Figure 3:
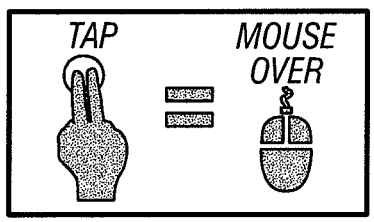
Figure 3:
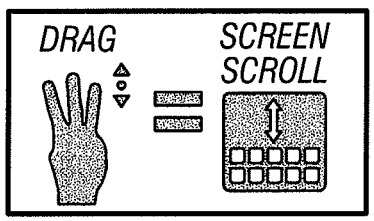
Figure 3:
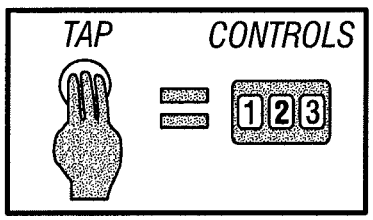

Likewise, FIG. 3 illustrates a graphical representation of a touch screen gesture translation table according to some embodiments of the invention.

Some other embodiments of the invention involve translating gyroscope control inputs received from a user of a client device into control instructions understandable by a remote desktop server. Many mobile client devices include an integrated gyroscope that roll, pitch, and yaw movements of the device into control instructions. Table 2 is an exemplary translation table equating gyroscope controls with movement controls common to a two-button mouse.

TABLE 2

| Gyroscope Control Input | Mouse Movement Input |
|---|---|
| Clockwise Rotation about Yaw Axis | Right |
| Counter Clockwise Rotation about Yaw Axis | Left |
| Clockwise Rotation about Pitch Axis | Down |
| Counter Clockwise Rotation about Pitch Axis | Up |
| Clockwise Rotation about Roll Axis | Auxiliary Command 1 |
| Counter Clockwise Rotation about Roll Axis | Auxiliary Command 2 |

As shown in Table 2, a clockwise rotation of the device about the yaw axis moves the mouse pointer right, a counter-clockwise rotation of the device about the yaw axis moves the mouse pointer left, a clockwise rotation of the device about the pitch axis moves the mouse pointer down, and a counter-clockwise rotation of the device about the pitch axis moves the mouse pointer up. Additionally, simultaneous movement of the device about two axis results in a vector translation to move the mouse pointer in a diagonal direction. In some embodiments of the invention, the pitch, roll, and yaw rotations must reach a threshold angle before registering as a movement.

In some embodiments of the invention, as also shown in Table 2, a clockwise rotation of the device about the roll axis initiates a first auxiliary command and a counterclockwise rotation of the device about the roll axis initiates a second auxiliary command. In some embodiments of the invention, the first auxiliary command and the second auxiliary command comprise right and left mouse clicks.

In some other embodiments of the invention, the first auxiliary command and the second auxiliary command are application specific. For example, when using the mobile device to show a slide show presentation, rotation of the device about the roll axis moves between previous slides and the next slides. In another example, when using the device in a video gaming application, rotation in the roll axis toggles through an inventory of virtual items or through a hierarchy of menu options.

Figure 4:
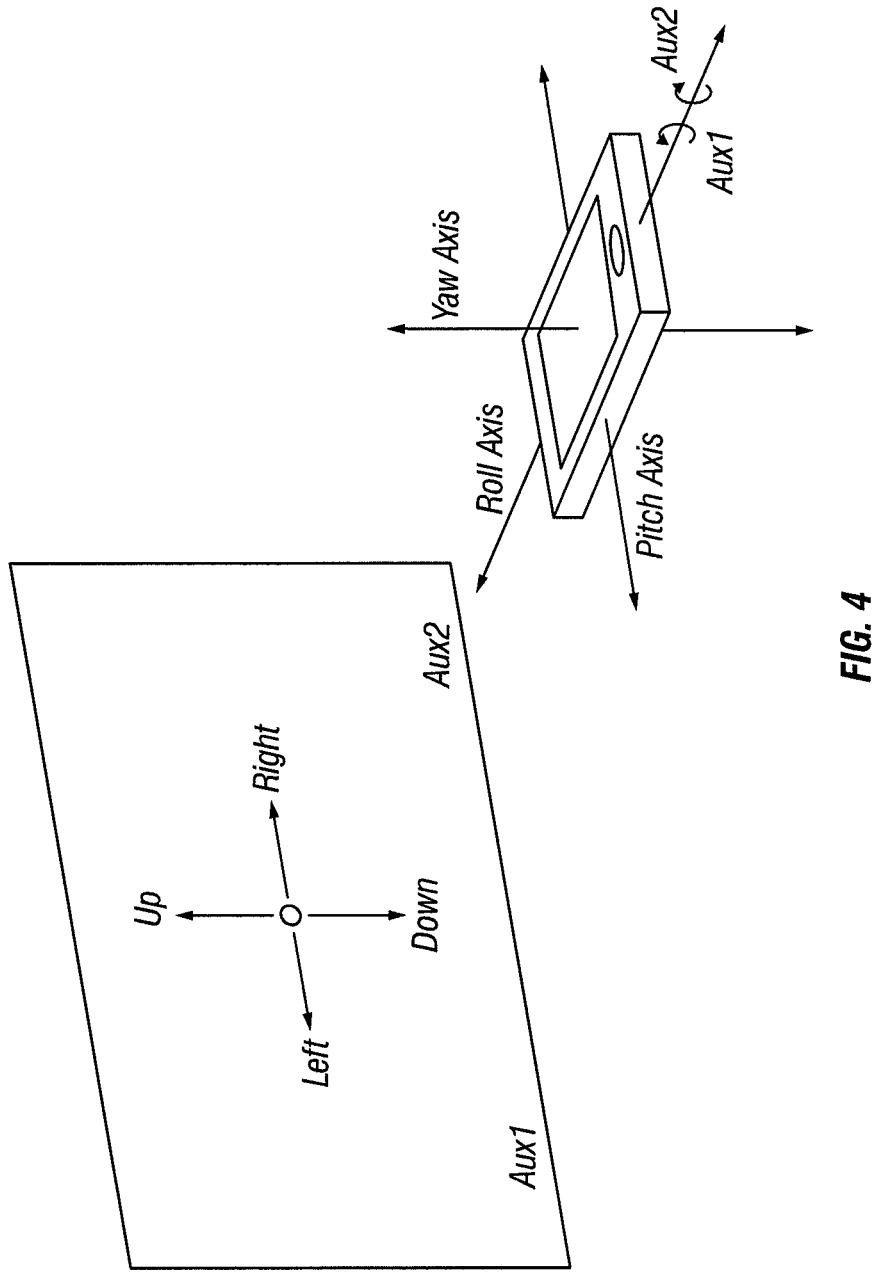
FIG. 4 illustrates a graphical representation of a gyroscope translation according to some embodiments of the invention.

FIG. 4 illustrates a graphical representation of a gyroscope translation according to some embodiments of the invention.

Some other embodiments of the invention involve translating control inputs received from a user via one or more of an accelerometer, a camera, a microphone, and other input devices now known or later developed. Although specific examples of translations are explicitly disclosed herein, it will be readily apparent to a person having ordinary skill in the art and having the benefit of this disclosure that the invention can perform any type of gesture translation that is required to control the desktop system with a client device.

In some other embodiments of the invention, the desktop system renders a depiction of a mouse or a game controller, along with a frame-by-frame video rendering. Additionally, the desktop system translates touch screen input into mouse or game controller input based on what portions of the virtual mouse or game controller are touched, and for how long.

Figure 5A:
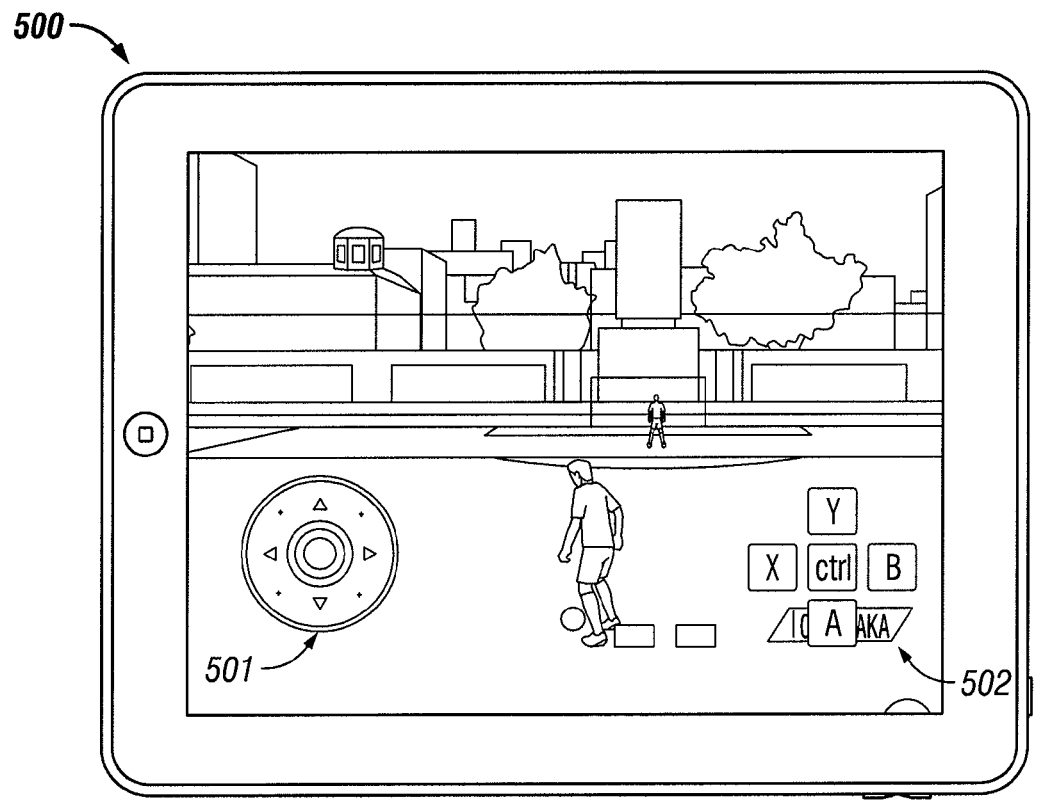
FIG. 5A illustrates a tablet computer with a touch screen interface and virtual controls according to some embodiments of the invention.

FIGS. 5A-5D illustrate examples of client rendering of input controls on a client device. FIG. 5A illustrates a tablet computer 501 with a touch screen interface and virtual controls 502, 503 according to some embodiments of the invention. According to FIG. 5A, the virtual controls 502, 503 comprise a virtual joystick and a set of virtual buttons. In these embodiments, a user taps the virtual buttons and moves the virtual joystick to control gameplay.

Figure 5B:
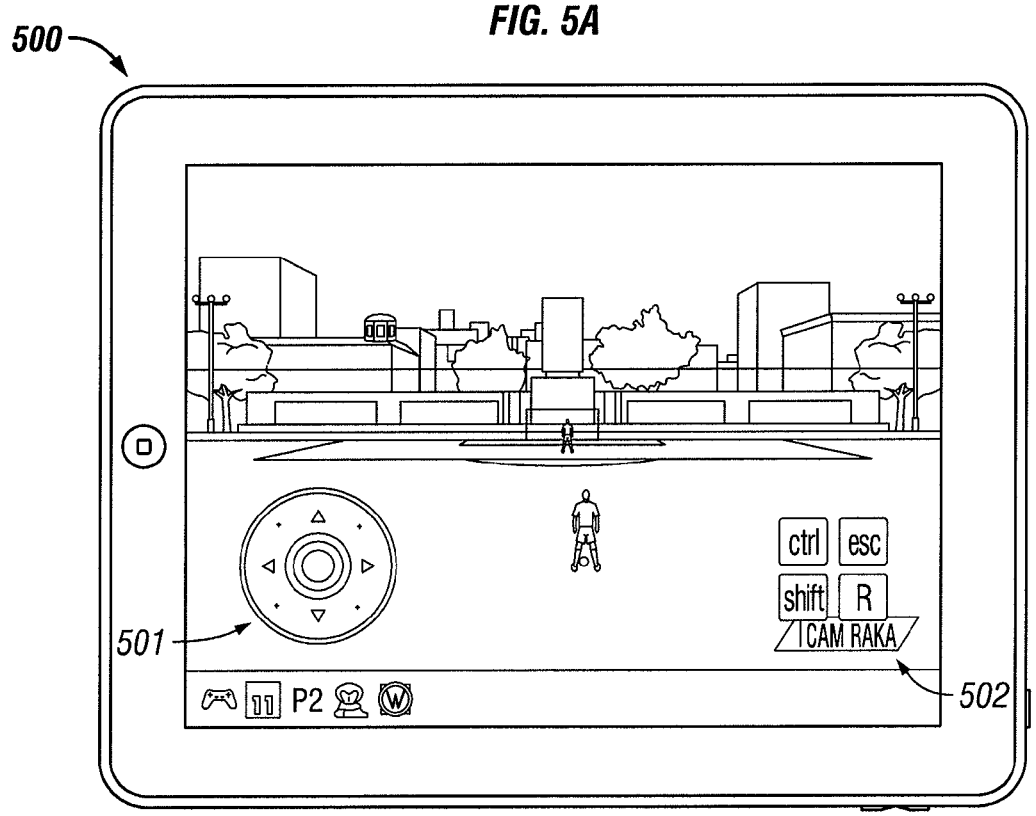
FIG. 5B illustrates a tablet computer with a touch screen interface and virtual controls according to some embodiments of the invention.
Figure 5C:
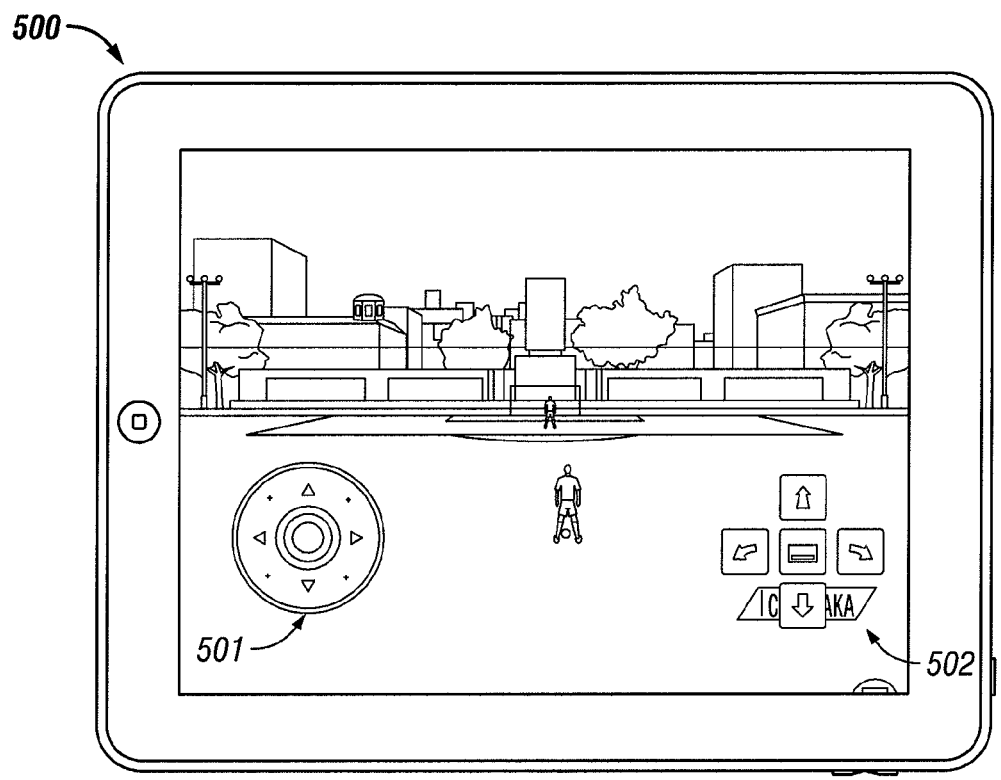
FIG. 5C illustrates a tablet computer with a touch screen interface and virtual controls according to some embodiments of the invention.
Figure 5D:
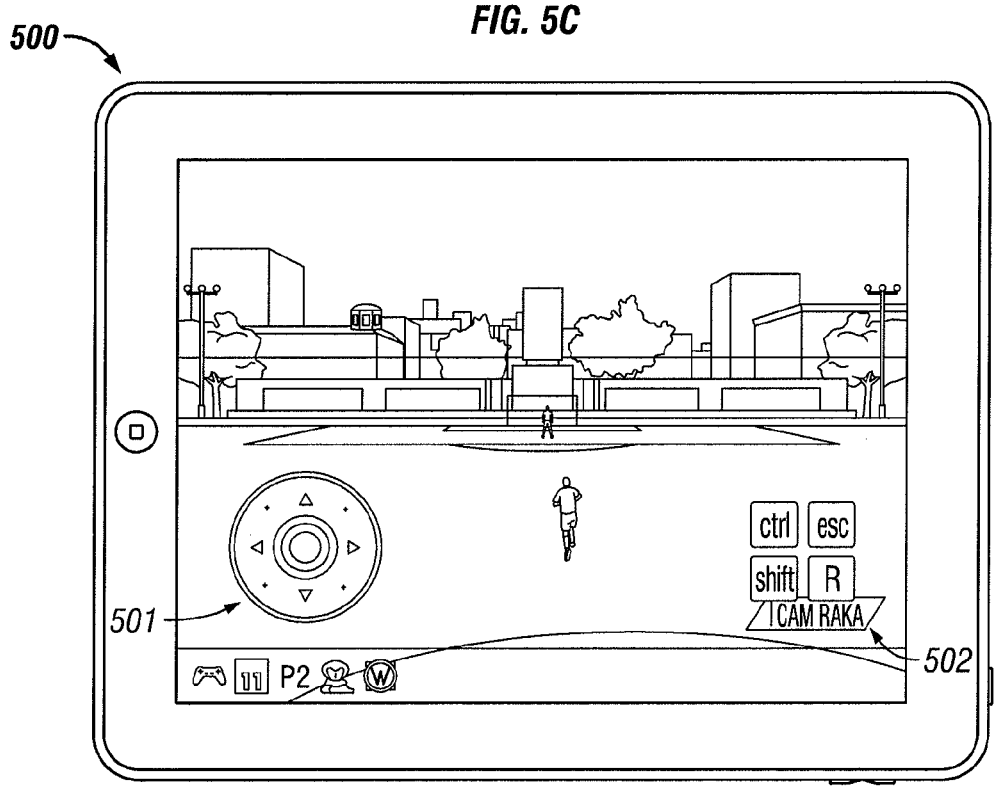
FIG. 5D illustrates a tablet computer with a touch screen interface and virtual controls according to some embodiments of the invention.

FIGS. 5B-5D illustrate other examples of a tablet computer 501 with a touch screen interface and virtual controls 502, 503 according to some embodiments of the invention. In the presently preferred embodiments of the invention, the virtual controls 502, 503 provide the user with the ability to toggle between control types.

Peer-to-Peer Systems and Social Gaming Networks

In addition to rendered images of a mouse or a game controller, some embodiments of the invention involve receiving information about other people's desktops and rendering an image of another user's screen.

In some embodiments of the invention, the application on the client device includes a module for receiving encoded video streams from more than one desktop simultaneously. In some embodiments, the application includes a module for displaying a selection screen in which a user can chose one desktop from the many remote desktops to view.

Some embodiments of the invention involve a peer-to-peer architecture in which applications running on a first user's desktop are encoded and streamed to a second user's device via a peer-to-peer infrastructure.

Some embodiments involve a module configured for listing a social network of buddies and for rendering one or more buddies' desktop upon selection of a thumbnail image. Likewise, some embodiments of the invention involve a gaming social network feature.

A large part of the enjoyment in playing video games is the social interaction between online friends and integrating game experiences of your friends with your experiences. Accordingly, some embodiments of the invention involve a client device receiving an encoded video stream of one or more of a user's friends' gaming experiences and viewing a decoded video of those experiences on the user's device.

Figure 6:
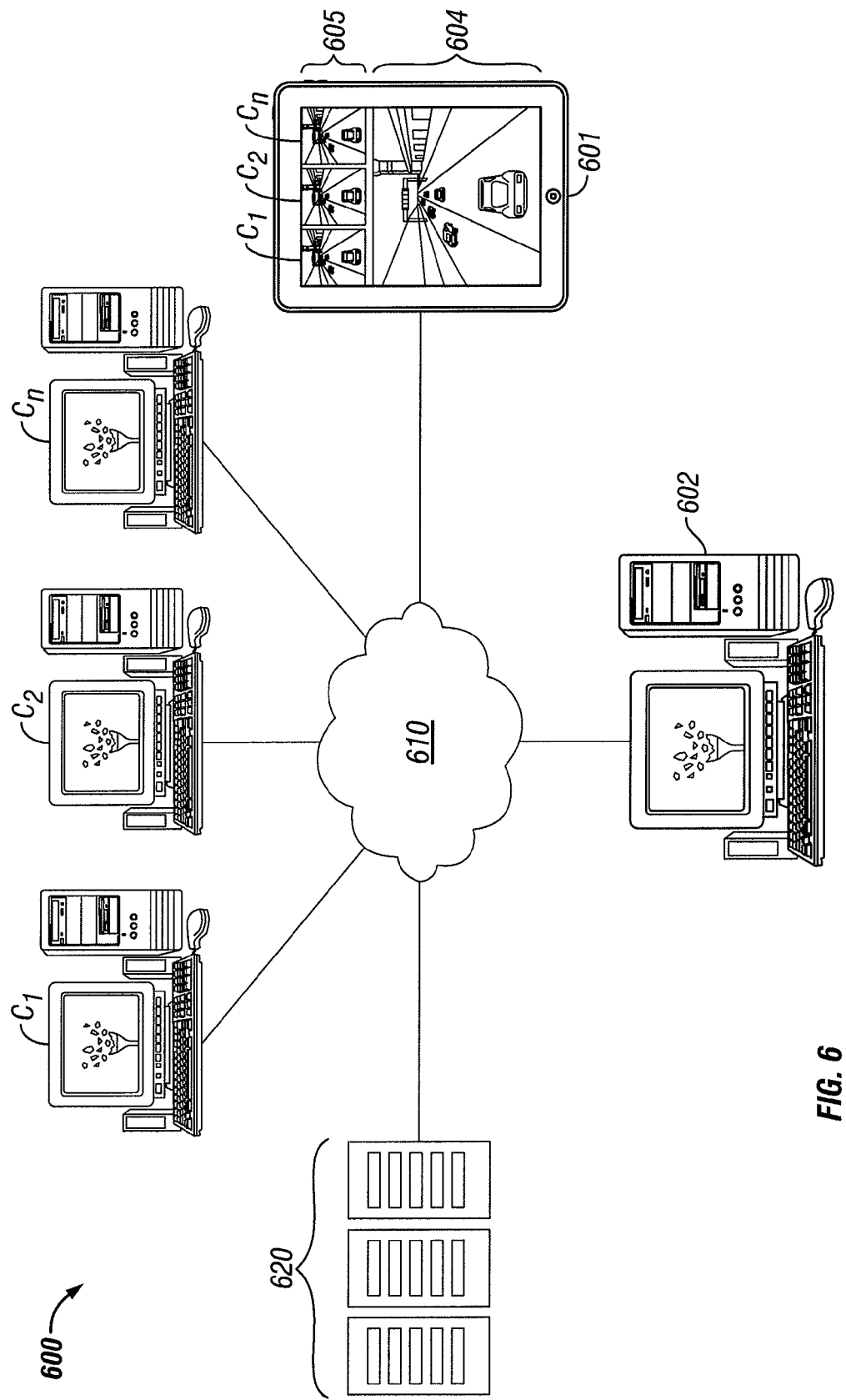
FIG. 6 illustrates an exemplary system for viewing social gaming network on a client device according to some embodiments of the invention.

FIG. 6 illustrates an exemplary system 600 for viewing social gaming network on a client device 601 according to some embodiments of the invention. The system 600 comprises one or more game servers 620 coupled with a user's computer 602 and with a plurality of client computers $c_1$, $c_2$, ..., $c_n$ via one or more network 610 including a local area network (LAN), personal area network (PAN), wide area network (WAN), metropolitan area network (MAN), wireless local area network (WLAN), wireless wide area network (WWAN), peer-to-peer network, or other computer network, now know or later developed.

In some embodiments of the invention, the client device 601 includes a hardware or software module configured for displaying a user's gameplay experience in a main frame 604 and for displaying one or more other players' gameplay experiences in a buddy frame 605.

The one or more game servers 620 render a unique gaming environment individually for the user computer 602 and for each of the client computers $c_1$, $c_2$, ..., $c_n$. The user computer 602, as well as the client computers $c_1$, $c_2$, ..., $c_n$, encode the gameplay that is displayed on their desktops and stream the encoded data to the client device 601 over the one or more network 610.

The client device 601 is configured with a hardware or software module configured for decoding the video data and rendering a user's gameplay in a main window 604 as well as rendering the gameplay of the users of the client computers $c_1$, $c_2$, ..., $c_n$ in the main frame 604 and the buddy frame 605, respectively.

Automatic Video Decoder Adjustment for Passive Viewing/Multi-Modal

As explained above, it is often the case that a user of a client device operates the device with the expectation that inputs on the device will seamlessly result in the intended result, thereby necessitating low latency encoding and avoiding buffering. However, buffering a video stream before encoding or decoding increases the quality of the video playback, i.e. smoothness of the video data.

Despite the general scenario that low latency is the paramount attribute, it is sometimes the case that a user will consume video content passively or semi-passively without providing regular inputs, i.e. watching a movie or other non-interactive video. Therefore, some embodiments of the invention involve systems and methods for automatically determining when a user is consuming content passively and applying a buffer to increase video quality.

Figure 7:
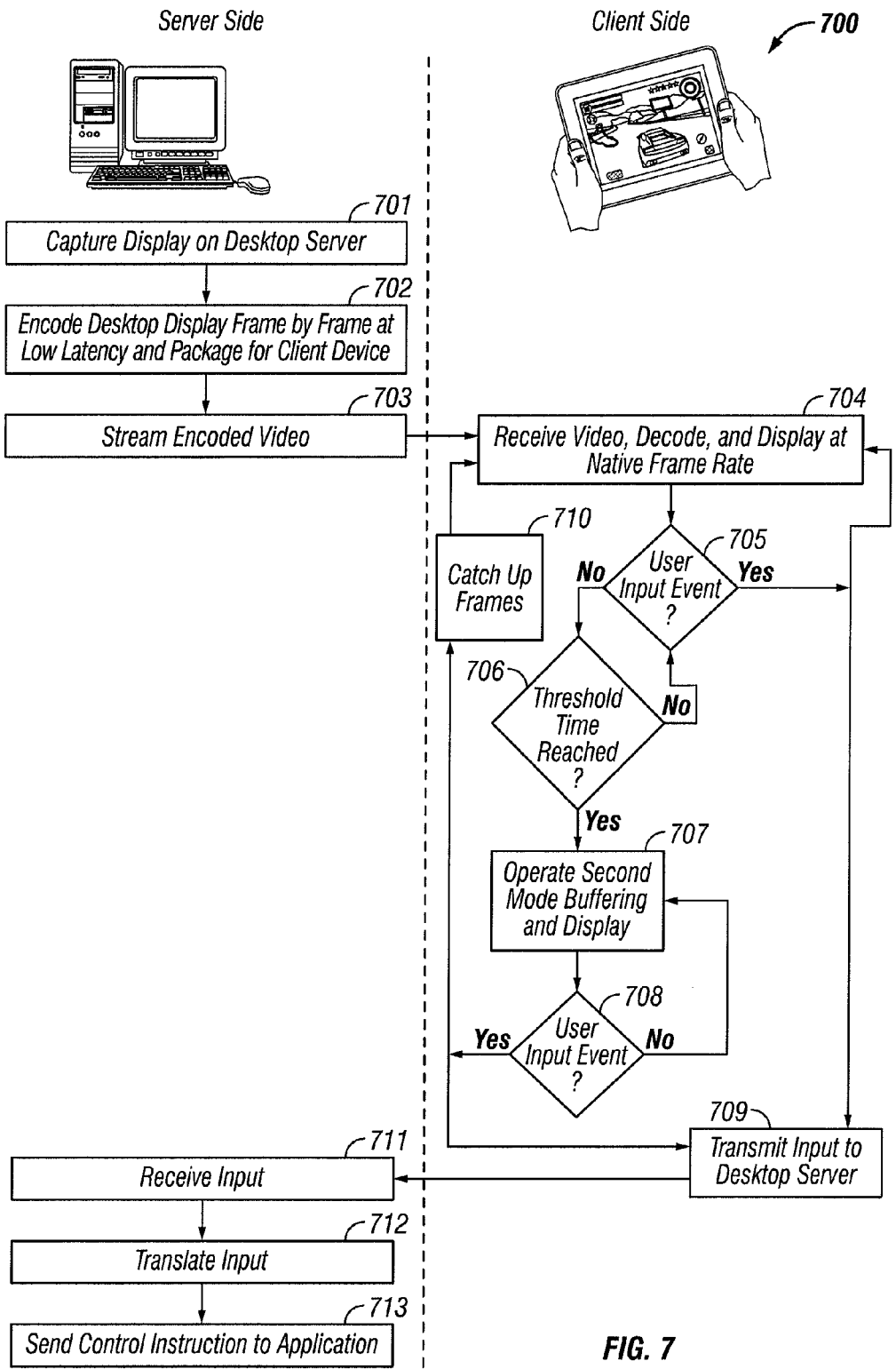
FIG. 7 illustrates a method of dual-mode video stream encoding, streaming, and playback according to some embodiments of the invention.

FIG. 7 illustrates a method 700 of multi-modal video stream encoding, streaming, decoding, and playback according to some embodiments of the invention. The method 700 begins on the server-side with capturing the display on a desktop server 701. The captured desktop display is encoded at a first frame rate and packaged for one or more client devices 702. The encoded video is then streamed to one or more client device 703. Once streamed video is received by an application on the client-side from the server-side, the video is decoded and played back on the client device at the first frame rate 704.

The client-side application is configured for accepting user inputs and transmitting them back to the desktop server for translation and control. Accordingly, the method waits for a user input event 705. If the client device receives a user input, the client device will continue to operate at a first frame rate 704 and will transmit the input to the desktop server 709 for translation. If a user input is not received at 705, the method 700 determines if a threshold time has been reached 706. If a threshold time has not been reached, the method 700 simply waits longer for a user input.

In the event of a threshold time being reached without the receipt of a user input, the method will begin to operate in a second mode of buffering and display 707. The second mode comprises decoding the stream video and playing it back at a lesser frame rate than the encoded video was streamed, thereby building a buffer and resulting in a smoother video playback.

The method 700 again waits for a user input event 708. Until an event occurs, the method 700 continues to operate in a second mode 707. However, in the event of a user input, the method 700 catches up frames to match the display of the desktop server 710 and reverts to displaying at the first frame rate 704 and transmits the input to the desktop server 709.

The method continues by the desktop server receiving the transmitted user inputs 711, translating the inputs into control instructions 712, and sending control instructions to the relevant application 713.

In some embodiments of the invention, the step of catching up frames 710 simply involves trashing all of the buffered frames and beginning display of the current desktop frame. In some other embodiments, the step of catching up frames 710 involves speeding up frame rate faster than the first frame rate until the video catches up with the current desktop frame.

In one particular example, the dual mode aspect occurs as follows. In a desktop server-client environment, a desktop sever displays a movie, encodes the video, multiplexes the encoded video with audio, and streams the multiplexed signal to a client device. Suppose the video encoding is performed at 30 frames per second (fps). Initially, the video decoder in the client side decodes the stream at thirty fps to ensure that latency is not noticed by the user of the client device. However, after the threshold time period, the decoder begins to decode the video by a lesser amount that is unperceivable by the user. For example, the client side application might begin playing back the video at 29.5 fps. This difference is likely not perceivable by a human user, but the net result is that a buffer is built up. Thereafter, if the network conditions are slowed for whatever reason, the buffer allows the playback of a slightly delayed video without interruption.

Next, in the event of a user input, the client side application catches up to the current desktop frame and reverts to the first, non-buffering mode.

Figure 8:
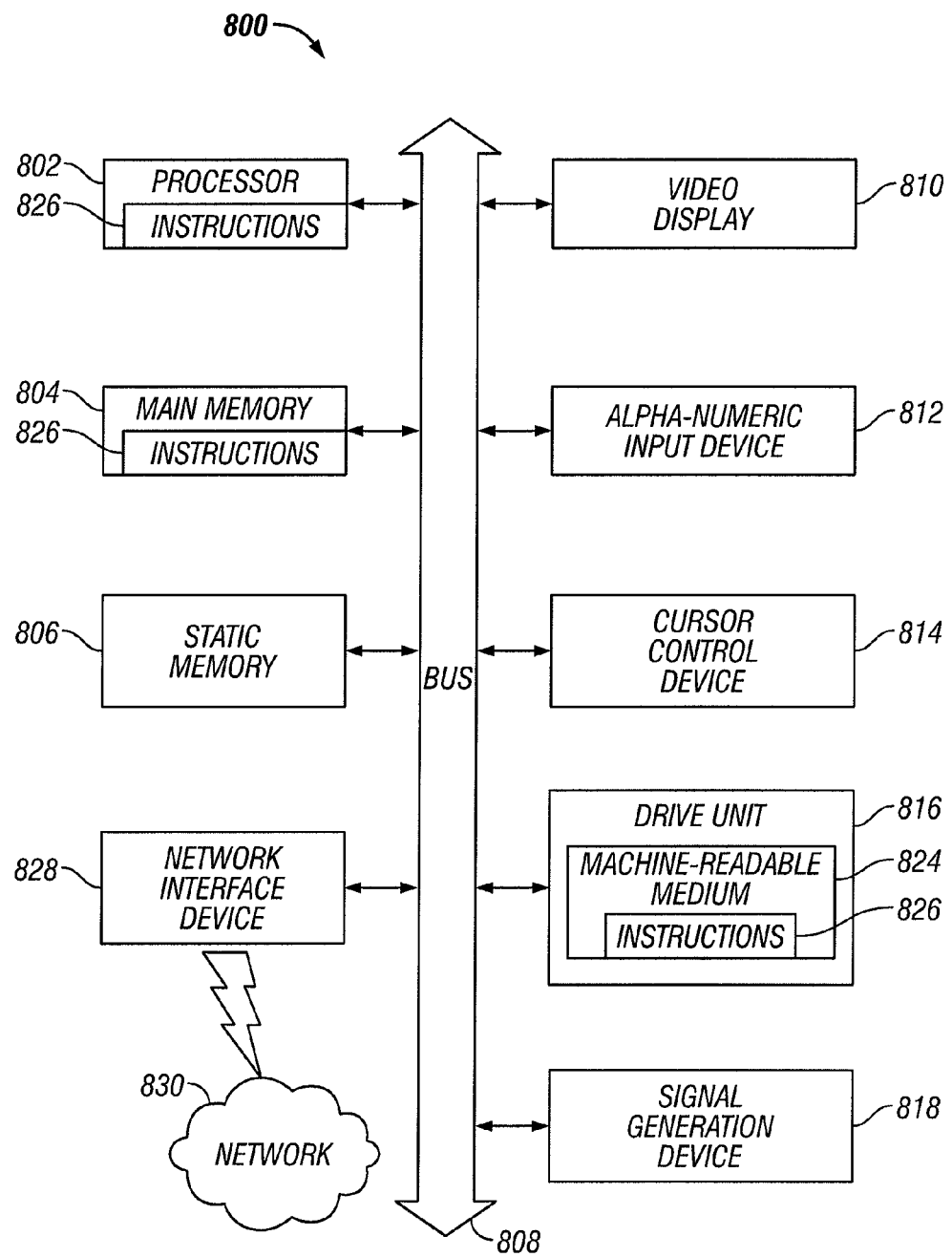
FIG. 8 is a block schematic diagram of a machine in the exemplary form of a computer system within which a set of instructions may be programmed to cause the machine to execute the logic steps of the invention.

FIG. 8 is a block schematic diagram of a machine in the exemplary form of a computer system within which a set of instructions may be programmed to cause the machine to execute the logic steps of the invention.

In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 800 includes a processor 802, a main memory 804 and a static memory 806, which communicate with each other via a bus 808. The computer system 500 may further include a display unit 810, for example, a liquid crystal display (LCD) or a cathode ray tube (CRT). The computer system 800 also includes an alphanumeric input device 812, for example, a keyboard; a cursor control device 814, for example, a mouse; a disk drive unit 816, a signal generation device 818, for example, a speaker, and a network interface device 820.

The disk drive unit 816 includes a machine-readable medium 824 on which is stored a set of executable instructions, i.e. software, 826 embodying any one, or all, of the methodologies described herein below. The software 826 is also shown to reside, completely or at least partially, within the main memory 804 and/or within the processor 802. The software 826 may further be transmitted or received over a network 828, 830 by means of a network interface device 820.

In contrast to the system 800 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention described herein with reference to the preferred embodiments, one skilled in the art will readily appreciate that other applications may be substituted for those set forth herein without departing from the spirit and scope of the invention. Accordingly, the invention should only be limited by the Claims included below.

The invention claimed is:

1. A method of viewing and controlling a computer display remotely on a client device comprising:
    configuring a computer with at least one processing module and at least one input device configured for receiving user input of a first type;
    modifying the computer resolution to reduce the encoding effort and scaling for displaying on the client;
    capturing at least one computer image stream at a first frame rate using said at least one processing module;
    packaging said at least one image stream for transmission to at least one client device using said at least one processing module;
    encoding a packaged image stream, on a frame-by-frame basis, using said at least one processing module;

transmitting an encoded image stream to a client device using said processing module and a computer network interface via at least one network;
receiving a transmitted image stream on said at least one client device using a client network interface;
decoding a received image stream, on a frame-by-frame basis, using a decoding module on said at least one client device;
determining that a threshold period has lapsed, thereby triggering a second display mode comprising:
selectively skipping frames of said received image stream, thereby building an image stream buffer; and
displaying, in said second display mode, said decoded image stream at said first frame rate minus said skipped frames on a display of said at least one client device;
receiving at least one client input of a second input type on said at least one client device, thereby triggering a reversion to said first display mode;
catching up to a current frame of said received transmitted image stream, thereby discarding said buffer;
displaying a decoded image stream at said first frame rate on a display of said at least one client device;
receiving at least one client input of a second input type on said at least one client device;
translating said at least one client input of a second input type into a translated input of a first input type, thereby forming at least one control instruction transmitting said at least one client input of a second input type from at least one client device to said computer via said at least one network interface and via said at least one network;
receiving said at least one client input of a second input type by said computer network interface; and
controlling said computer using said at least one control instruction.

2. The method of claim 1, wherein the step of translating is performed by said at least one client device.

3. The method of claim 1, wherein the step of translating is performed by said at least one processing module.

4. The method of claim 1, wherein the step of configuring a computer with at least one processing module comprises configuring said computer with a hardware computer processor with an embedded graphics controller.

5. The method of claim 1, wherein the step of configuring a computer with at least one processing module comprises configuring said computer with a hardware computer processor coupled with a hardware graphics accelerator.

6. The method of claim 1, wherein the step of configuring a computer with at least one processing module comprises configuring said computer with a hardware computer processor coupled with a dedicated hardware encoder.

7. The method of claim 6, wherein the step of configuring a computer with a hardware computer processor coupled with a dedicated hardware encoder comprises coupling said hardware computer processor with a hardware encoder is integral to said computer.

8. The method of claim 6, wherein the step of configuring a computer with a hardware computer processor coupled with a dedicated hardware encoder comprises coupling said hardware computer processor with a hardware encoder peripheral to said computer.

9. The method of claim 5, wherein the step of capturing at least one computer image stream comprises capturing said computer image stream using a graphics driver of said graphics accelerator and a screen capture API recognizable by said computer processor.

10. The method of claim 1,
wherein the step of configuring a computer with at least one processing module comprises further comprises configuring said computer with a multi-core or multi-thread processor,
wherein the step decoding a received image stream, on a frame-by-frame basis, using a decoding module further comprises decoding using a multi-core decoding module,
wherein the step of capturing at least one computer image stream comprises:
dividing said computer image into a plurality of regional frames;
capturing each regional frame of said plurality of regional frames individually using said at least one processing module, thereby forming a plurality of display image threads;
wherein the step of encoding further comprises encoding individual display image threads with individual processing cores of said multi-core or multi-thread processor;
wherein the step of decoding a received image stream further comprises:
decoding individually encoded display image threads by individual processing cores of said multi-core or multi-thread client processor; and
combining decoded display threads for display on said display of said at least one client device.

11. The method of claim 1, wherein the step of packaging said image stream for transmission further comprises:
scaling said image stream to at least one aspect ratio native to said at least one client device;
converting a color image space to a native color image space native to said at least one client device; and
combining and multiplexing a scaled and color-converted image stream with at least one time-stamped audio packet.

12. The method of claim 1, wherein the step of decoding a received image stream comprises software decoding.

13. The method of claim 1, wherein the step of decoding a received image stream comprises decoding using a peripheral hardware decoder coupled with said at least one client device.

14. The method of claim 1,
wherein the step of receiving at least one client input of a second input type further comprises receiving, via a touch screen interface, a touch screen input; and
wherein the step of translating said at least one client input of a second type into a translated input of a first type further comprises translating said touch screen input into a mouse pointer input.

15. The method of claim 1,
wherein the step of receiving at least one client input of a second input type further comprises receiving, via a gyroscope-controlled interface, at least one of a pitch rotation, a roll rotation, and a yaw rotation; and
wherein the step of translating said at least one client input of a second type into a translated input of a first type further comprises translating said at least one of a pitch rotation, a roll rotation, and a yaw rotation into a mouse pointer and mouse click input.

16. The method of claim 1,
wherein the step of displaying a decoded image stream at said first frame rate on a display of said at least one client device further comprises rendering a representation of virtual controller having controls of said first input type; and wherein said second input type comprises virtual manipulation of controls of said first input type via said virtual controller.

17. The method of claim 1, further comprising:
capturing a plurality of computer image streams,
packaging said plurality of computer image streams for transmission to at least one client device using said at least one processing module;
encoding said plurality of computer image streams, each on a frame-by-frame basis, using said at least one processing module;
transmitting a plurality of encoded image streams to a client device using said processing module and a computer network interface via at least one network;
receiving a plurality of transmitted image streams on said at least one client device using a client network interface;
decoding a plurality of received image streams, on a frame-by-frame basis, using a decoding module on said at least one client device;
displaying a plurality of decoded image streams at said first frame rate on a display of said at least one client device.

18. A multi-modal method of viewing and controlling a computer display remotely on a client device comprising:
configuring a computer with at least one processing module; a computer display; and at least one input device configured for receiving user input of a first type;
capturing a computer image stream at a first frame rate using said at least one processing module;
packaging said image stream for transmission to at least one client device using said at least one processing module;
encoding a packaged image stream, on a frame-by-frame basis, using said at least one processing module;
transmitting an encoded image stream to a client device using said processing module and a computer network interface via at least one network;
receiving a transmitted image stream on said at least one client device using a client network interface;
decoding a received image stream, on a frame-by-frame basis, using a decoding module on said at least one client device;
displaying, in a first display mode, a decoded image stream at said first frame rate on a display of said at least one client device;
monitoring said at least one client device to determine if a threshold period of time lapses without a user input on said at least one client device;
determining that a threshold period has lapsed, thereby triggering a second display mode comprising:
selectively skipping frames of said received image stream, thereby building an image stream buffer; and
displaying, in said second display mode, said decoded image stream at said first frame rate minus said skipped frames on a display of said at least one client device;
receiving at least one client input of a second input type on said at least one client device, thereby triggering a reversion to said first display mode;
catching up to a current frame of said received transmitted image stream, thereby discarding said buffer;
displaying, in said first display mode, said decoded image stream at said first frame rate on a display of said at least one client device;

transmitting said at least one client input of a second input type from at least one client device to said computer via said at least one network interface and via said at least one network;
receiving said at least one client input of a second input type by said computer network interface;
translating said at least one client input of a second input type into a translated input of a first input type using said at least one using said at least one processing module, thereby forming at least one control instruction; and
controlling said computer using said at least one control instruction.

19. The multi-modal method of claim 18, wherein said threshold period ranges between 15 seconds and 2 minutes.

20. The multi-modal method of claim 18, wherein the step of catching up to a current frame of said received transmitted image stream comprising immediately discarding all buffered frame and displaying the most recent decoded image frame on a display of said at least one client device.

21. The multi-modal method of claim 18, wherein the step of catching up to a current frame of said received transmitted image stream comprising displaying one or more of the buffered frames at an increased frame rate until reaching the most recent decoded image frame.

22. A system for viewing and controlling a computer display remotely on a client device comprising:
a computer system comprising:
a processor;
at least one input device configured for receiving user input of a first type;
a screen capture module configured for modifying the display resolution and capturing at least one computer image stream at a first frame rate;
a packaging module configured for packaging said at least one image stream for transmission to at least one client device;
an encoder module configured for encoding a packaged image stream, on a frame-by-frame basis; and
a network interface operatively coupled with said processor and configured for transmitting an encoded image stream to a client device; and
a client device comprising:
a client device processor;
a receiver configured for receiving a transmitted image stream on said at least one client device;
a decoder configured for decoding a received image stream, on a frame-by-frame basis;
a client device display configured for displaying a decoded image stream at said first frame rate;
a client input system configured for receiving user input of a second type;
a multi-modal trigger module configured for determining that a threshold period has lapsed, thereby triggering a second display mode;
wherein, while in said second display mode, said client device processor is further configured for selectively skipping frames of said received image stream, thereby building an image stream buffer
wherein, while in said second display mode, said client device processor is further configured for displaying, said decoded image stream at said first frame rate minus said skipped frames on a display of said at least one client device;
wherein said client device processor is further configured for reverting to said first display mode upon receiving an input;

an input translation module configured for translating said at least one client input of a second input type into a translated input of a first input type in part or full using, thereby forming at least one control instruction; and transmitter configured for transmitting said at least one control instruction to said computer;

wherein said network interface of said computer system is further configured for receiving said at least one control instruction by said computer network interface;

wherein said computer system further comprises a controller configured controlling at least one application running on said computer using said at least one control instruction.

23. The system of claim 22, wherein said processor is operatively coupled with a dedicated hardware encoder containing said encoder module.

24. The system of claim 22, wherein said processor comprises a multi-core processor, wherein said decoder on said client device comprises a multi-core decoder.

25. The system of claim 24, wherein said screen capture module further comprises:

a screen divider configured for dividing said computer image into a plurality of regional frames;

a regional frame capture module configured for capturing each regional frame of said plurality of regional frames individually, thereby forming a plurality of display image threads;

wherein said multi-core processer is further configured for encoding individual display image threads with individual processing cores; and wherein said decoder is further configured for decoding individually encoded display image threads by individual processing cores of said multi-core decoder.

26. The system of claim 22, wherein said client input system further comprises a touch screen interface, and wherein said input translation module is further configured for translating touch screen inputs into mouse pointer and mouse click inputs.

27. The system of claim 26, wherein said client device processor is further configured for rendering a virtual representation of an input device and displaying said virtual representation of an input device on said client device display, and wherein said client input system is further configured receiving user input by user virtually manipulating said virtual representation of an input device via said touch screen interface.

28. The system of claim 22, wherein said client input system further comprises a gyro-scope interface, and wherein said input translation module is further configured for translating at least one of a pitch rotation, a roll rotation, and a yaw rotation into mouse pointer and mouse click inputs.

29. A system for translating inputs comprising:
a first computer device comprising:
a processor;
a memory device;
a display configured for displaying an image stream; and
a user input system configured for receiving inputs of a first input type selected from among mouse pointer and clicks, video game controller inputs, gyroscope rotational inputs, accelerometer inputs, camera inputs, and microphone inputs;
at least one additional computer device comprising:
at least one additional processor;
at least one additional memory device;
at least one additional display configured for displaying an image stream;
at least one additional user input system configured for receiving inputs of a second input type that is different from said first input type and that is selected from among mouse pointer and clicks, gyroscope rotational inputs, accelerometer inputs, camera inputs, and microphone inputs;
a multi-modal trigger module configured for determining that a threshold period has lapsed, thereby triggering a second display mode;
wherein, while in said second display mode, said client device processor is further configured for selectively skipping frames of said received image stream, thereby building an image stream buffer
wherein, while in said second display mode, said client device processor is further configured for displaying, said decoded image stream at said first frame rate minus said skipped frames on a display of said at least one client device;
wherein said client device processor is further configured for reverting to said first display mode upon receiving an input;
an input translation module, operatively coupled with said first computer device and with said at least one additional computer device, and configured for translating said first input type into said second input type, in part or in full.

30. A system for viewing and controlling a computer display remotely on a client device comprising:
a computer system comprising:
a processor;
at least one input device configured for receiving user input of a first type;
a screen capture module configured for modifying the display resolution and capturing at least one computer image stream at a first frame rate;
a packaging module configured for packaging said at least one image stream for transmission to at least one client device;
an encoder module configured for encoding a packaged image stream, on a frame-by-frame basis; and
a network interface operatively coupled with said processor and configured for transmitting an encoded image stream to a client device; and
a client device comprising:
a client device processor;
a receiver configured for receiving a transmitted image stream on said at least one client device;
a decoder configured for decoding a received image stream, on a frame-by-frame basis;
a client device display configured for displaying a decoded image stream at said first frame rate in a first display mode;
a client input system configured for receiving user input of a second type;
an input monitor configured for monitoring said at least one client device to determine if a threshold period of time lapses without a user input on said at least one client device;
a multi-modal trigger module configured for determining that a threshold period has lapsed, thereby triggering a second display mode;
wherein, while in said second display mode, said client device processor is further configured for selectively skipping frames of said received image stream, thereby building an image stream buffer
wherein, while in said second display mode, said client device processor is further configured for displaying, said decoded image stream at said first frame rate minus said skipped frames on a display of said at least one client device;
wherein said client device processor is further configured for reverting to said first display mode upon receiving a input;
an input translation module configured for translating said at least one client input of a second input type into a translated input of a first input type in part or full using, thereby forming at least one control instruction; and
a transmitter configured for transmitting said at least one control instruction to said computer;
wherein said network interface of said computer system is further configured for receiving said at least one control instruction by said computer network interface;
wherein said computer system further comprises a controller configured controlling at least one application running on said computer using said at least one control instruction.

* * * * *